(12) United States Patent
Kerns

(10) Patent No.: US 9,169,955 B2
(45) Date of Patent: Oct. 27, 2015

(54) HELICAL SPLINE LOCK

(75) Inventor: Keith A. Kerns, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 325 days.

(21) Appl. No.: 13/550,760

(22) Filed: Jul. 17, 2012

(65) Prior Publication Data

US 2014/0021718 A1    Jan. 23, 2014

(51) Int. Cl.
*F16L 37/22*    (2006.01)
*F16L 41/12*    (2006.01)

(52) U.S. Cl.
CPC ...................................... *F16L 41/12* (2013.01)

(58) Field of Classification Search
USPC .......... 285/18, 39, 276, 292.1, 305, 321, 330
See application file for complete search history.

(56) References Cited

U.S. PATENT DOCUMENTS

| | | | | | |
|---|---|---|---|---|---|
| 3,239,244 | A | * | 3/1966 | Leinfelt | 285/7 |
| 3,606,402 | A | * | 9/1971 | Medney | 285/305 |
| 4,697,947 | A | * | 10/1987 | Bauer et al. | 403/14 |
| 4,749,192 | A | * | 6/1988 | Howeth | 285/86 |
| 5,411,298 | A | * | 5/1995 | Pollack | 285/94 |
| 6,325,424 | B1 | * | 12/2001 | Metcalfe et al. | 285/305 |
| 6,343,813 | B1 | * | 2/2002 | Olson et al. | 285/305 |
| 6,739,629 | B2 | * | 5/2004 | Riedy et al. | 285/305 |

* cited by examiner

*Primary Examiner* — Aaron Dunwoody
*Assistant Examiner* — Fannie Kee

(57) ABSTRACT

A helical spline lock for securing an inlet duct to a portion of a combustor body includes a helical spline key having a helical shape defined at least in part by a shape of a combustor body. A first lug is disposed about the combustor body and has a first channel for at least partially receiving and interfacing with the helical spline key. A second lug is disposed about an inlet duct and has a second channel for at least partially receiving and interfacing with the helical spline key. The first lug and the second lug are configured to mate with one another to form a helical keyway from the first and second channels, and the helical spline key is insertable into the keyway to secure the inlet duct to the combustor body.

20 Claims, 6 Drawing Sheets

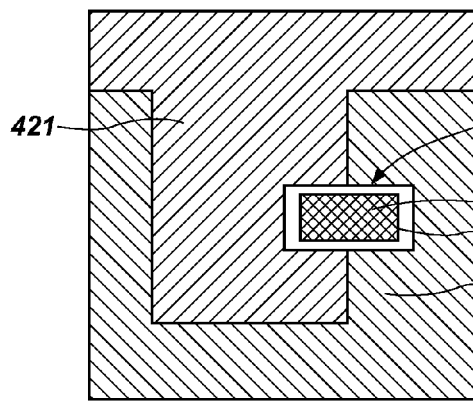
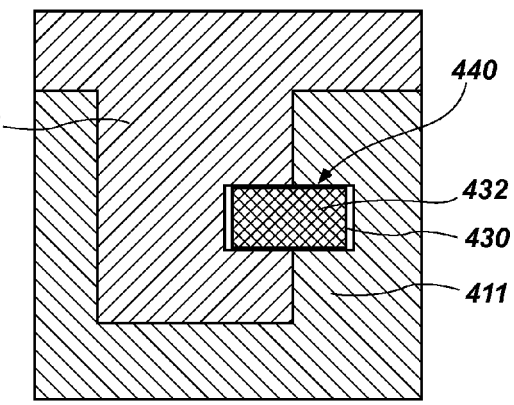
FIG. 7A              FIG. 7B
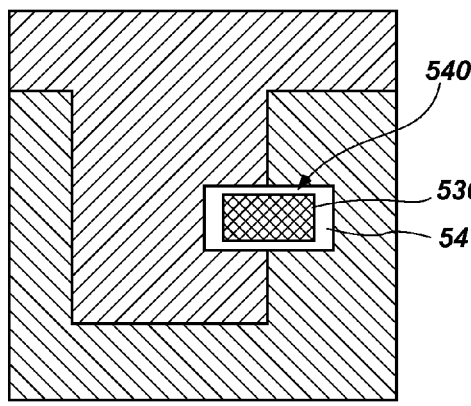
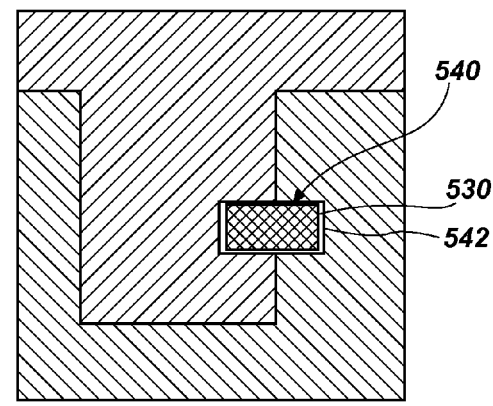
FIG. 8A              FIG. 8B

HELICAL SPLINE LOCK

BACKGROUND

Often it is desirable to attach an inlet duct to a curved body, such as a curved combustor body. Such couplings are typically secured with fasteners spaced around the entire perimeter of the interface between the inlet duct and the combustor body. This can be desirable to maintain a seal at the interface, for example. In some cases, the configuration of the inlet duct and the combustor body can obscure a portion of the perimeter, such as an inlet duct running parallel and in close proximity to the combustor body. Such a configuration can hinder or prevent assembly of the fasteners from the exterior of the inlet body and combustor body. Volume and pressure constraints can limit the viability of assembling the fasteners from the interior of the inlet body or combustor body.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein:

FIGS. 7A and 7B are example illustrations of cross-sections of a "tapered" helical spline key in a helical keyway formed by a protrusion lug and a recess lug, in accordance with an embodiment of the present invention.

FIGS. 8A and 8B are example illustrations of cross-sections of a "tapered" helical keyway formed by a protrusion lug and a recess lug, in accordance with an embodiment of the present invention.

Figure 1:
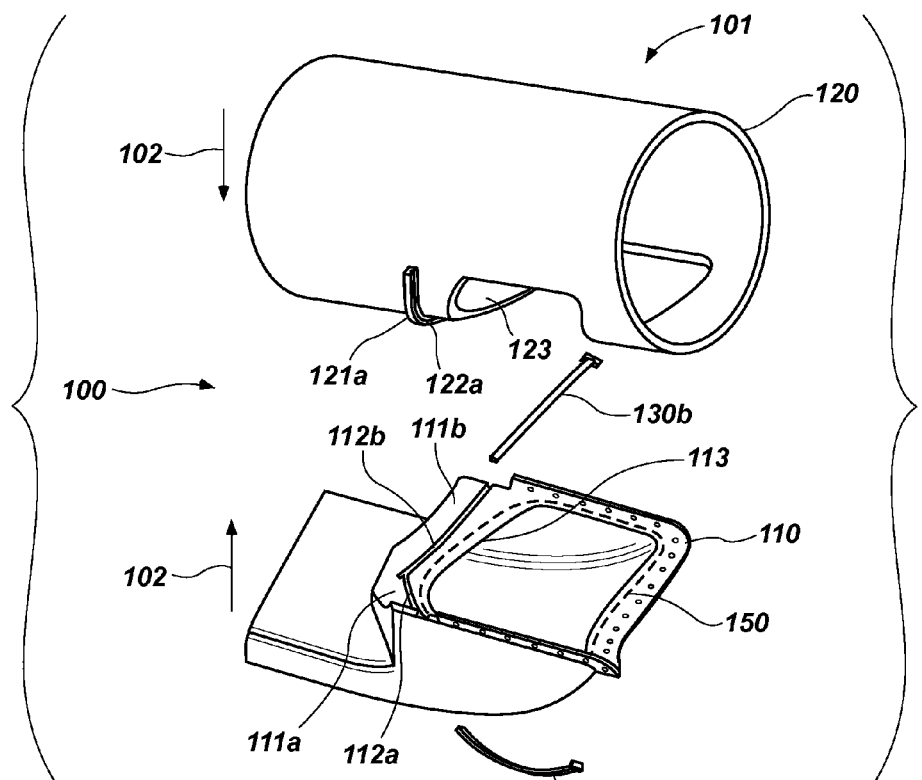
FIG. 1 is an example illustration of a helical spline lock for securing an inlet duct to a portion of a combustor body, in accordance with an embodiment of the present invention.

Reference will now be made to the exemplary embodiments illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, the terms "helix" and "helical" refer to a three-dimensional spiral curve.

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Although typical fasteners are suitable for securing an inlet duct to a combustor body in many situations, certain inlet duct and combustor body configurations, however, can preclude using fasteners in certain applications when fastener access is obscured by the inlet duct and/or the combustor body.

A helical spline lock is disclosed herein for securing an inlet duct to a portion of a combustor body that is particularly useful in a region that is obscured by the inlet duct and/or the combustor body. In one aspect, the helical spline lock provides access from a side that is not obscured by the inlet duct or the combustor body. The helical spline lock can comprise a helical spline key having a helical shape defined at least in part by a shape of a combustor body. The helical spline lock can also comprise a first lug disposed about the combustor body and having a first channel for at least partially receiving and interfacing with the helical spline key. Additionally, the helical spline lock can comprise a second lug disposed about an inlet duct and having a second channel for at least partially receiving and interfacing with the helical spline key. The first lug and the second lug can be configured to mate with one another to form a helical keyway from the first and second channels. The helical spline key can be insertable into the keyway to secure the inlet duct to the combustor body.

A helical spline lock system is also disclosed. The system can comprise first and second helical spline keys, each having a helical shape defined at least in part by a shape of a combustor body. The system can also comprise first and second combustor body lugs disposed about the combustor body, each having a channel for at least partially receiving and interfacing with at least one of the first and second helical spline keys. Additionally, the system can comprise first and second inlet duct lugs disposed about an inlet duct, each having a channel for at least partially receiving and interfacing with at least one of the first and second helical spline keys. The first combustor body lug and the first inlet duct lug can be configured to mate with one another to form a first helical keyway from the channels. The second combustor body lug and the second inlet duct lug can be configured to mate with one another to form a second helical keyway from the channels. One of the first and second helical spline keys can be insertable into the first keyway and the other of the first and second helical spline keys can be insertable into the second keyway to secure the inlet duct to the combustor body.

Figures 2A, 2B:
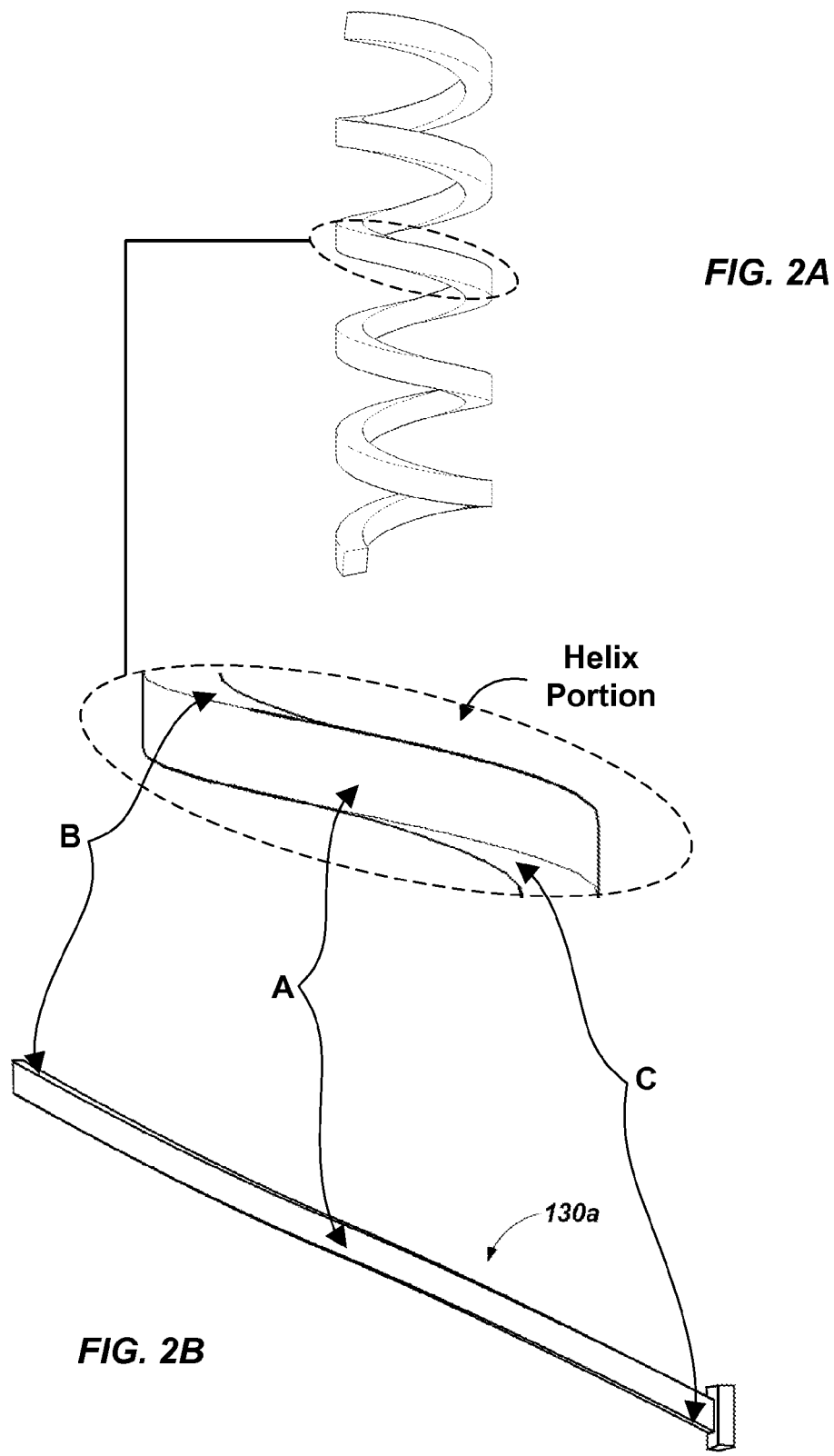
FIG. 2A is an example illustration of a three-dimensional helix structure having an identified helical portion.
FIG. 2B is an example illustration of a helical spline key, in accordance with an embodiment of the present invention.

One embodiment of a helical spline lock 100 for securing an inlet duct 110 to a portion of a combustor body 120 is illustrated in FIG. 1. The helical spline lock 100 can comprise a helical spline key 130a having a helical shape defined at least in part by a shape of the combustor body 120. The helical shape of the helical spline key can be a right-handed or a left-handed helix. The shape of the combustor body 120 can comprise any suitable shape, such as a cylindrical shape, a conical shape, or combinations thereof. The combustor body 120 illustrated in the figure, for example, includes a cylindrical shape. The cylindrical shape of the combustor body 120 can therefore form the basis for the helical shape of the helical spline key 130a. A close-up view of the helical spline key 130a is shown in FIG. 2B, with the helical spline key 130a comprising a helical shape similar to the shape of the helical portion identified in the exemplary helix of FIG. 2A (see comparison portions identified as A-C).

Figure 3:
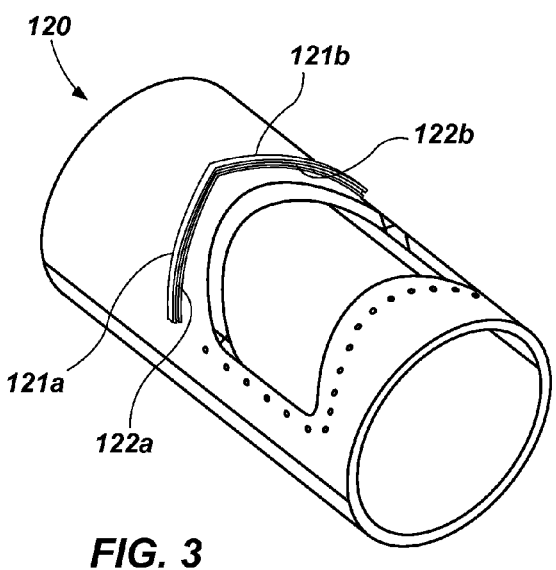
FIG. 3 is an example illustration of a lug on a combustor body, in accordance with an embodiment of the present invention.

With reference to FIG. 3, and continued reference to FIG. 1, a lug 121a can be disposed about the combustor body 120. The lug 121a can have a channel 122a for at least partially receiving and interfacing with the helical spline key 130a. As shown in FIG. 1, a lug 111a can be disposed about the inlet duct 110. Like the lug 121a, the lug 111a can have a channel 112a for at least partially receiving and interfacing with the helical spline key 130a.

Figure 4:
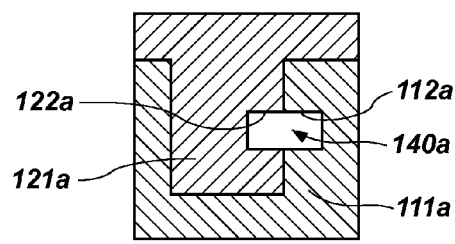
FIG. 4 is an example illustration of a cross-section of a helical keyway formed by channels in mated protrusion and recess lugs, in accordance with an embodiment of the present invention.
Figure 5:
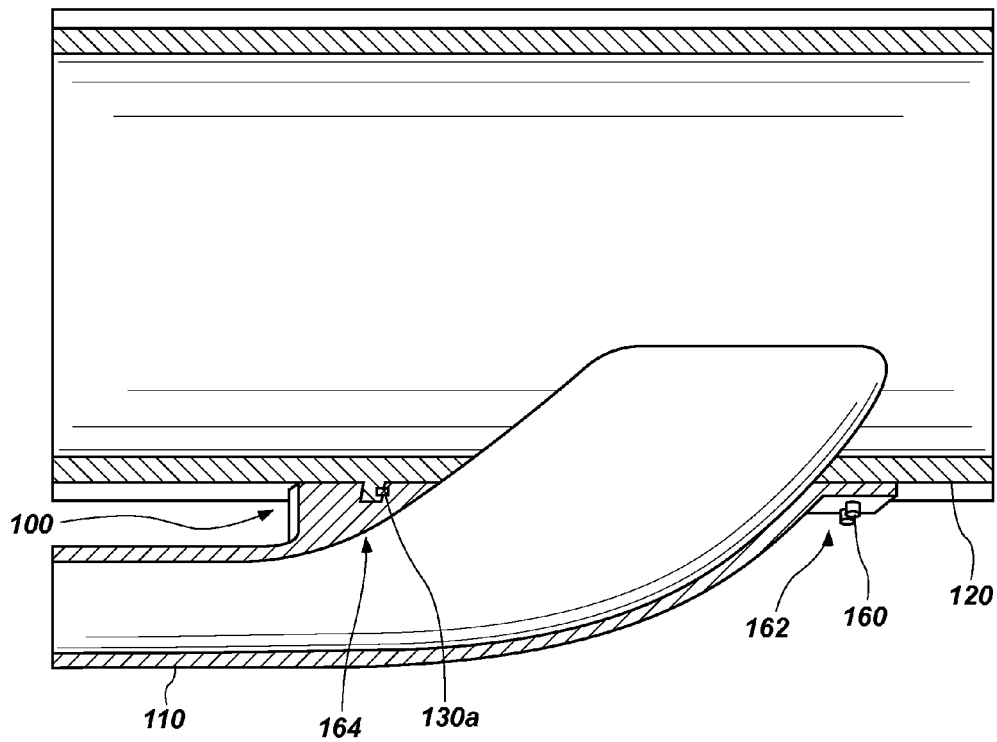
FIG. 5 is an example illustration of a cross-section of an inlet duct secured to a combustor body with a helical spline lock, in accordance with an embodiment of the present invention.

As shown in FIG. 4, the lug 121a of the combustor body and the lug 111a of the inlet duct can be configured to mate with one another to form a helical keyway 140a from or out of the channels 122a, 112a configured to receive the helical spline key 130a. The helical spline key 130a can therefore be insertable into the keyway 140a to secure the inlet duct 110 to the combustor body 120, as shown in FIG. 5. With a suitable helix angle, the channels 122a, 112a can closely approximate or follow at least a portion of curves 113, 123 about an opening between the inlet duct 110 and the combustor body 120, and maintain a locking force close to the opening. The curves 113, 123, for example, are formed by a generally rectangular cross-sectional inlet duct 110 mating to a cylindrical combustor body 120. Additionally, by using a helical form, the locking force of the helical spline lock can be in close proximity to the interfacing edges of the curves 113, 123.

A helical spline lock system 101 is also illustrated in FIG. 1. For example, the system 101 can include a plurality of helical spline keys 130a, 130b, as discussed hereinabove, each having a helical shape defined at least in part by a shape of a combustor body 120. The helical shape of the helical spline keys 130a, 130b can be any suitable shape to facilitate coupling of the inlet duct 110 and the combustor body 120. In one aspect, the helical shape of the helical spline keys 130a, 130b can be configured as a right-handed helix or left-handed helix. As shown, for example, helical spline key 130a is configured as a left-handed helix and helical spline key 130b is configured as a right-handed helix. This configuration of the helical spline keys 130a, 130b allows for access from opposite sides of the inlet duct 110 to facilitate coupling in a region that is obscured by the inlet duct 110 and/or the combustor body 120. This can provide a mechanical lock along a seam between the inlet duct and the combustor body that may be difficult to access externally with conventional fasteners.

FIG. 3 illustrates combustor body lugs 121a, 121b disposed about the combustor body 120. The combustor body lugs can be integral structures with one another or physically separate from one another. Each combustor body lug 121a, 121b can have a channel 122a, 122b, respectively, for at least partially receiving and interfacing with at least one of the helical spline keys 130a, 130b. Inlet duct lugs 111a, 111b can be disposed about the inlet duct 110. The inlet duct lugs can be integral structures with one another or physically separate from one another. Each inlet duct lug 111a, 111b can have a channel 112a, 112b, respectively, for at least partially receiving and interfacing with at least one of the helical spline keys 130a, 130b.

Thus, as illustrated in FIG. 1, the inlet duct 110 and the combustor body 120 can be secured to one another by moving the inlet duct 110 and the combustor body 120 toward one another in direction 102 such that the combustor body lugs 121a, 121b mate with the inlet duct lugs 111a, 111b. The channels in the mated lugs form keyways. For example, the combustor body lug 121a and the inlet duct lug 111a are configured to mate with one another to form a first helical keyway from the channels 122a, 112a, and the combustor body lug 121b and the inlet duct lug 112b are configured to mate with one another to form a second helical keyway from the channels 122b, 112b. One of the helical spline keys 130a, 130b is insertable into the first keyway and the other of the helical spline keys 130a, 130b is insertable into the second keyway to secure the inlet duct 110 to the combustor body 120.

In one aspect, the mated combustor body lug 121a and inlet duct lug 111a and the mated combustor body lug 121b and inlet duct lug 111b limit relative movement between the combustor body 120 and the inlet duct 110, such that the first and second helical spline keys 130a, 130b primarily experience shear loads. As illustrated in FIG. 4, the lug 121a of the combustor body 120 can comprise a protrusion and the lug 111a can comprise a recess configured to receive and mate with the protrusion of the combustor body 120. Additionally, it should be recognized that an inlet duct can comprise a protrusion and a combustor body can comprise a recess configured to receive and mate with the protrusion of the inlet duct. It should also be recognized that any number of helical spline keys can be used with corresponding channels and associated lugs to secure an inlet duct to a combustor body.

In one aspect, shown in FIG. 1, the system 101 can also include a seal 150, such as an O-ring or a gasket, disposed between the combustor body 120 and the inlet duct 110. The seal 150 can be compressed upon assembly of the combustor body 120 and the inlet duct 110 to minimize or prevent leakage at the interface between the combustor body 120 and the inlet duct 110.

As illustrated in FIG. 5, a fastener 160 can also be used to secure the inlet duct 110 to the combustor body 120 in a region 162 not secured by a helical spline key. In a particular aspect, the helical spline lock 100 can be located at a region 164 that is at least partially obscured by the inlet duct 110 and the combustor body 120, which region 164 can be difficult to access using fasteners to secure the inlet duct 110 to the combustor body 120. The side access made possible by use of the helical spline lock 100 can therefore simplify securing the inlet duct 110 to the combustor body 120 in the region 164 that is at least partially obscured by the inlet duct 110 and the combustor body 120.

Figure 6A:
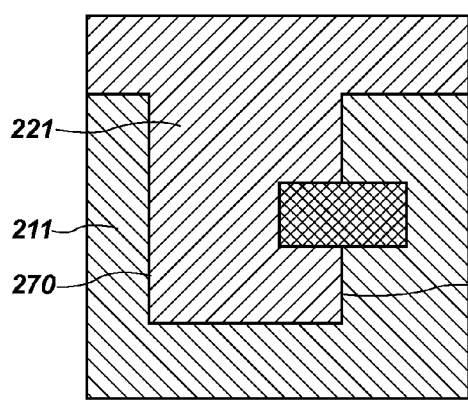
FIG. 6A is an example illustration of a cross-section of a "straight" interface configuration between a protrusion lug and a recess lug, in accordance with an embodiment of the present invention.
Figure 6B:
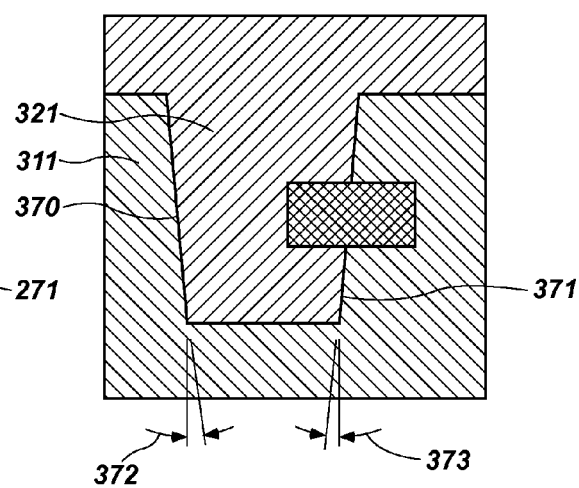
FIG. 6B is an example illustration of a cross-section of a "tapered" interface configuration between a protrusion lug and a recess lug, in accordance with an embodiment of the present invention.

FIGS. 6A and 6B illustrate two example interface configurations between mating lugs. FIG. 6A illustrates a "straight" interface configuration, in which side walls of the protrusion lug 221 and the recess lug 211 form parallel interfaces 270, 271. FIG. 6B, on the other hand, illustrates a "tapered" interface configuration, in which side walls of the protrusion lug 321 and the recess lug 311 form nonparallel interfaces 370, 371. Each interface 370, 371 can have a taper angle 372, 373, respectively. The taper angles 372, 373 can be the same or different from one another. A tapered interface may be desirable to increase the ease of assembly or facilitate mating of the protrusion lug 321 and the recess lug 311.

In some embodiments, a helical spline key and/or a helical keyway can be tapered to provide increasing interference between the helical spline key and the helical keyway as the helical spline key is inserted into the helical keyway. FIGS. 7A and 7B, for example, illustrate a "tapered" helical spline key 430. The tapered helical spline key 430 can have increasing cross-sectional areas 431, 432 along at least a portion of its length orthogonal to a longitudinal axis to provide increasing interference between the helical spline key 430 and the helical keyway 440, which is formed by the protrusion lug 421 and the recess lug 411, as the helical spline key 430 is inserted into the helical keyway 440.

On the other hand, FIGS. 8A and 8B illustrate a "tapered" helical keyway 540. The tapered helical keyway 540 can have decreasing cross-sectional areas 541, 542 along at least a portion of its length orthogonal to a longitudinal axis to provide increasing interference between the helical spline key 530 and the helical keyway 540 as the helical spline key 530 is inserted into the helical keyway 540. Tapering a helical spline key or helical keyway can provide a clamping force as the helical key is inserted into position. Furthermore, by configuring the helical keyway or the helical keyway with a taper, the inlet duct and the combustor body can be further drawn together as the helical spline key is inserted. In one aspect, this can compress an O-ring.

Figures 9A, 9B:
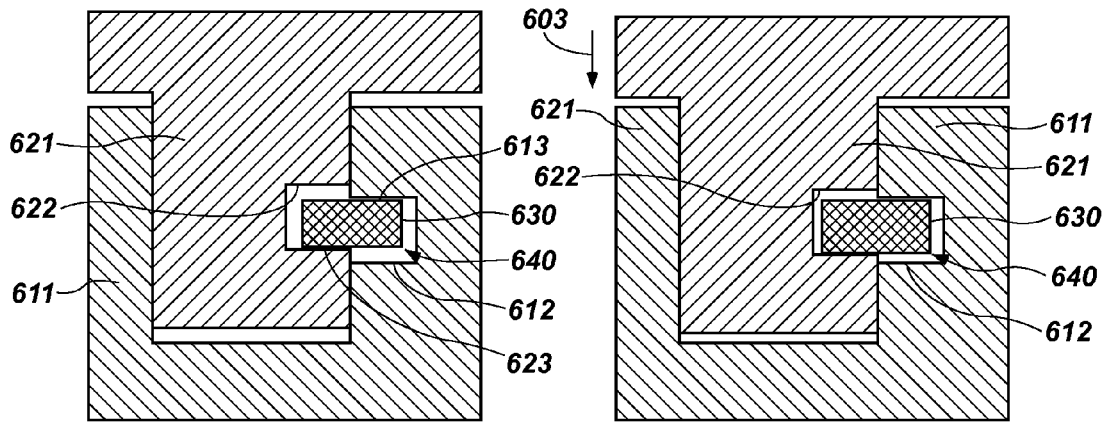
FIGS. 9A and 9B are example illustrations of cross-sections of a "tapered" helical spline key facilitating seating a protrusion lug in a recess lug, in accordance with an embodiment of the present invention.

It is possible that a protrusion lug will not fully seat in a recess lug prior to insertion of the helical spline key. In this event, a tapered helical spline key and/or a tapered helical keyway can not only provide increasing interference between the helical spline key and the helical keyway, but can also facilitate proper seating of the protrusion lug in the recess lug. FIGS. 9A and 9B, for example, illustrate how a tapered helical spline key 630 can function to align channels 612, 622 that form a helical keyway 640. As the helical spline key 630 is inserted into the keyway 640, the helical spline key 630 can contact one side 613 of the channel 612 and one side 623 of the channel 622. The increasing cross-sectional area of the helical spline key 630 can therefore force the protrusion lug 621 in direction 603 into the recess lug 611, which can tend to seat the protrusion lug 621 into the recess lug 611. The protrusion lug 621 and the recess lug 611 can be configured such that when the channels 612, 622 are aligned, the protrusion lug 621 is fully seated in the recess lug 611. A similar dynamic can occur when using a tapered helical keyway alone or in combination with a tapered helical spline key.

Figures 10A, 10B:
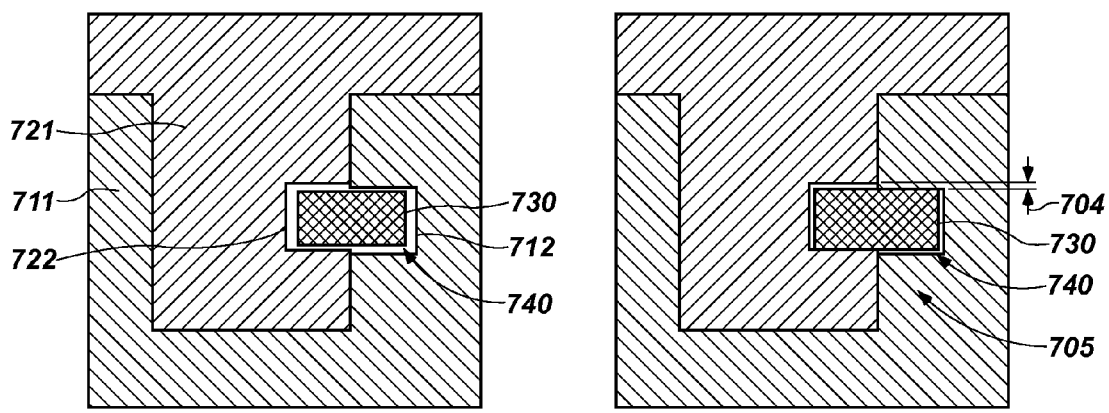
FIGS. 10A and 10B are example illustrations of cross-sections of a "tapered" helical spline key preloading a joint formed by a protrusion lug and a recess lug, in accordance with an embodiment of the present invention.

In some embodiments, a tapered helical spline key and/or a tapered helical keyway can be used to introduce a preload into the joint formed by a mating protrusion lug and a recess lug. For example, as illustrated in FIGS. 10A and 10B, channels 722, 712 of a protrusion lug 721 and recess lug 711, respectively, can be offset 704 to provide a preload in the joint 705. Specifically, upon mating and fully seating the protrusion lug 721 and the recess lug 711, the channel 722 and the channel 712 can be radially offset 704 from one another, such that insertion of the helical spline key 730 into the helical keyway 740 tends to align the channel 722 and the channel 712 causing a shear preload in the helical spline key 730. This can help ensure that the protrusion lug 721 and the recess lug 711 are fully seated and will not separate from one another. This also illustrates that the helical spline key is loaded in shear providing a constant load path along the joint. In one aspect, this configuration can also compress an O-ring to maintain a seal about the joint.

Figure 11A:
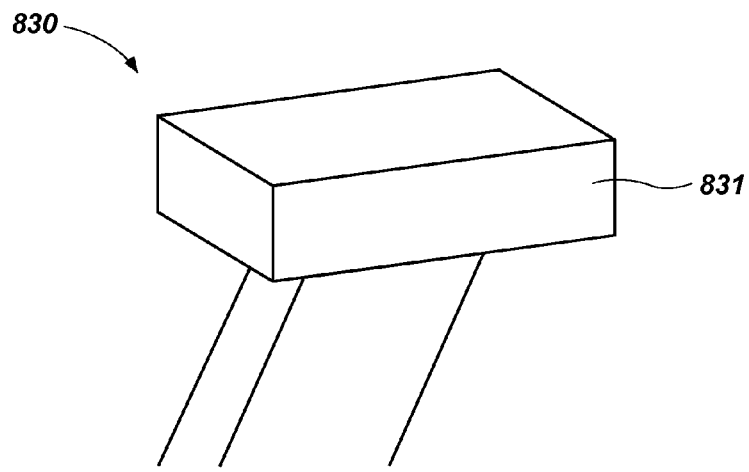
FIG. 11A is an example illustration of a helical spline key with a stopper to limit insertion of the helical spline key into a helical keyway, in accordance with an embodiment of the present invention.
Figure 11B:
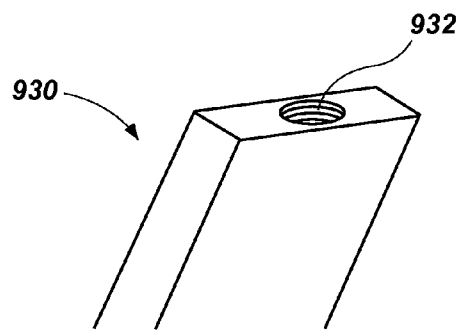
FIG. 11B is an example illustration of a helical spline key with a key removal feature configured to assist removal of the helical spline key from a helical keyway, in accordance with an embodiment of the present invention.
Figure 11C:
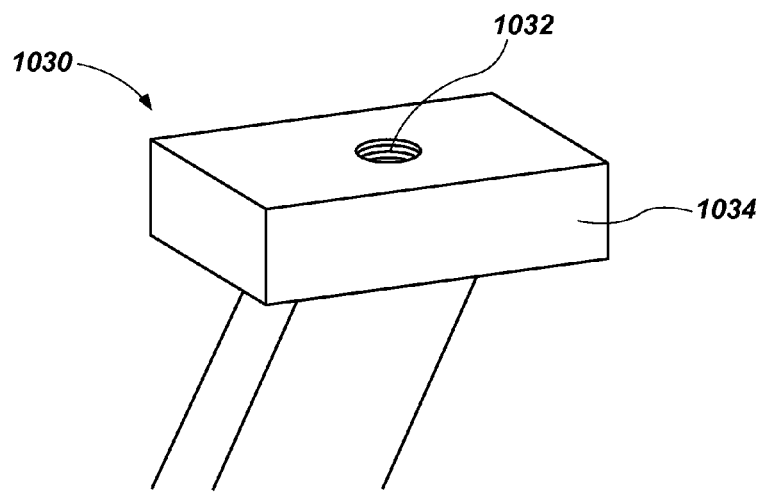
FIG. 11C is an example illustration of a helical spline key with a key removal feature associated with a stopper, in accordance with an embodiment of the present invention.

FIGS. 11A-11C illustrate different helical spline key end configurations. In one aspect, shown in FIG. 11A, a helical spline key 830 can have a stopper 831 disposed at a proximate end configured to limit insertion of the helical spline key 830 into a helical keyway. The stopper 831 can be sized such that it will not fit in the helical keyway. In another aspect, shown in FIG. 11B, a helical spline key 930 can have a key removal feature 932 configured to assist removal of the helical spline key 930 from a helical keyway. In a particular aspect, shown in FIG. 11C, a key removal feature 1032 can be associated with a stopper 1034 disposed at a proximal end of a helical spline key 1030. The key removal feature 1032 can have a threaded feature configured to interface with a tool to facilitate removal of the helical spline key from a keyway. As illustrated, a threaded feature can comprise a threaded hole. Of course, a threaded feature can also comprise a threaded stud. The threaded feature can be configured to facilitate attachment with a tool, such as a handle, a ring, a clip, a loop, a grip, or any other feature or device suitable to assist removal of the helical spline key from a helical keyway. In one aspect, the key removal feature can comprise a handle, a ring, a clip, a loop, a grip, etc., permanently attached to the helical spline key. In another aspect, a stopper can be configured to interface with a key removal tool, such that the key removal tool engages the stopper directly for removal of the helical spline key from the keyway. For example, the stopper can include a head or other component or feature configured to interface with a key removal tool, similar to a nail head interfacing with a V-shaped channel of a hammer, pry bar, or other tool for removing nails.

In accordance with one embodiment of the present invention, a method for securing an inlet duct to a portion of a combustor body is disclosed. The method can comprise obtaining a helical spline key having a helical shape defined at least in part by a shape of a combustor body. The method can further comprise mating a first lug disposed about the combustor body with a second lug disposed about an inlet duct, wherein the first lug includes a first channel for at least partially receiving and interfacing with the helical spline key and the second lug includes a second channel for at least partially receiving and interfacing with the helical spline key. Additionally, the method can comprise inserting the helical spline key into a keyway formed by the first and second channels upon mating the first lug and the second lug to secure the inlet duct to the combustor body. It is noted that no specific order is required in this method, though generally in one embodiment, these method steps can be carried out sequentially.

In one aspect, the method can further comprise obtaining a second helical spline key having a helical shape defined at least in part by a shape of the combustor body, mating a third lug disposed about the combustor body with a fourth lug disposed about the inlet duct, wherein the third lug includes a third channel for at least partially receiving and interfacing with the second helical spline key and the fourth lug includes a fourth channel for at least partially receiving and interfacing with the second helical spline key, and inserting the second helical spline key into a second keyway formed by the third and fourth channels upon mating the third lug and the fourth lug. In another aspect, the method can further comprise sealing an interface between the combustor body and the inlet duct.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the foregoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A helical spline lock system for securing an inlet duct to a portion of a combustor body, the helical spline lock comprising:
   a helical spline key having a helical shape defined at least in part by a shape of a combustor body;
   a first lug disposed about the combustor body and having a first channel for at least partially receiving and interfacing with the helical spline key; and
   a second lug disposed about an inlet duct and having a second channel for at least partially receiving and interfacing with the helical spline key,
   wherein the first and second channels have a helical shape, and
   wherein the first lug and the second lug are configured to mate with one another to form a helical keyway from the first and second channels, and wherein the helical spline key is insertable into the keyway to secure the inlet duct to the combustor body.

2. The helical spline lock system of claim 1, wherein the helical spline key further comprises a key removal feature configured to facilitate removal of the helical spline key from the keyway.

3. The helical spline lock system of claim 2, wherein the key removal feature is associated with a stopper disposed at a proximal end of the helical spline key configured to limit insertion of the key into the keyway, the key removal feature comprising a threaded feature configured to interface with a tool to facilitate removal of the helical spline key from the keyway.

4. The helical spline lock system of claim 1, wherein the helical spline key further comprises a stopper disposed at a proximate end configured to limit insertion of the key into the keyway.

5. The helical spline lock system of claim 1, wherein the helical keyway comprises decreasing cross-sectional areas along at least a portion of its length orthogonal to a longitudinal axis to provide increasing interference between the helical spline key and the helical keyway as the helical spline key is inserted into the helical keyway.

6. The helical spline lock system of claim 1, wherein the helical spline key comprises increasing cross-sectional areas along at least a portion of a length orthogonal to a longitudinal axis to provide increasing interference between the helical spline key and the helical keyway as the helical spline key is inserted into the helical keyway.

7. The helical spline lock system of claim 1, wherein upon mating the first lug and the second lug, the first channel and the second channel are radially offset from one another, such that insertion of the helical spline key into the helical keyway tends to align the first channel and the second channel causing a shear preload in the helical spline key.

8. The helical spline lock system of claim 1, wherein mating surfaces of the first lug and the second lug are tapered to facilitate mating.

9. The helical spline lock system of claim 1, wherein the first lug comprises a protrusion and the second lug comprises a recess configured to receive and mate with the protrusion of the first lug.

10. The helical spline lock system of claim 1, wherein the helical spline lock is located at a region at least partially obscured by the inlet duct and the combustor body.

11. The helical spline lock system of claim 1, wherein the shape of the combustor body comprises a cylindrical shape, a conical shape, or combinations thereof.

12. The helical spline lock system of claim 1, wherein a shape of the inlet duct comprises a generally rectangular cross-sectional shape.

13. A helical spline lock system, comprising:
   first and second helical spline keys, each having a helical shape defined at least in part by a shape of a combustor body;
   first and second combustor body lugs disposed about the combustor body, each having a channel for at least partially receiving and interfacing with at least one of the first and second helical spline keys; and first and second inlet duct lugs disposed about an inlet duct, each having a channel for at least partially receiving and interfacing with at least one of the first and second helical spline keys;

wherein the channels have a helical shape, wherein the first combustor body lug and the first inlet duct lug are configured to mate with one another to form a first helical keyway from the channels, wherein the second combustor body lug and the second inlet duct lug are configured to mate with one another to form a second helical keyway from the channels, and wherein one of the first and second helical spline keys is insertable into the first keyway and the other of the first and second helical spline keys is insertable into the second keyway to secure the inlet duct to the combustor body.

14. The system of claim 13, wherein the helical shape of the first helical spline key is a right-handed or a left-handed helix and the helical shape of the second helical spline key is a right-handed or a left-handed helix.

15. The system of claim 13, wherein the mated first combustor body lug and first inlet duct lug and the mated second combustor body lug and second inlet duct lug limit relative movement between the combustor body and the inlet duct, such that the first and second helical spline keys primarily experience shear loads.

16. The system of claim 13, further comprising a seal disposed between the combustor body and the inlet duct.

17. The system of claim 13, further comprising a fastener to secure the inlet duct to the combustor body in a region not secured by the helical spline keys.

18. A method for securing an inlet duct to a portion of a combustor body, comprising:

obtaining a helical spline key having a helical shape defined at least in part by a shape of a combustor body;

mating a first lug disposed about the combustor body with a second lug disposed about an inlet duct, wherein the first lug includes a first channel for at least partially receiving and interfacing with the helical spline key and the second lug includes a second channel for at least partially receiving and interfacing with the helical spline key, wherein the first and second channels have a helical shape; and inserting the helical spline key into a keyway formed by the first and second channels upon mating the first tug and the second lug to secure the inlet duct to the combustor body.

19. The method of claim 18, further comprising:

obtaining a second helical spline key having a helical shape defined at least in part by a shape of the combustor body;

mating a third tug disposed about the combustor body with a fourth lug disposed about the inlet duct, wherein the third lug includes a third channel for at least partially receiving and interfacing with the second helical spline key and the fourth lug includes a fourth channel for at least partially receiving and interfacing with the second helical spline key; and inserting the second helical spline key into a second keyway formed by the third and fourth channels upon mating the third lug and the fourth lug.

20. The method of claim 18, further comprising sealing an interface between the combustor body and the inlet duct.

* * * * *